Jan. 15, 1963   E. N. SHAWHAN   3,073,160
CAPACITY TYPE LEVEL METER
Filed Sept. 9, 1958   2 Sheets-Sheet 2
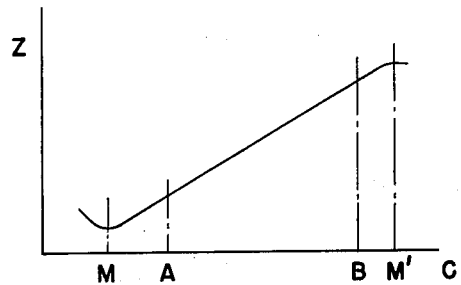
FIG. 2.
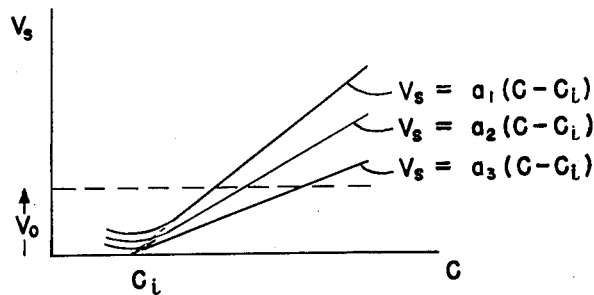
FIG. 3.
FIG. 4.
$$(1) \quad V_0 = a\left[C_2 + C_{30} + (k-1)C_3' + C_4 - C_L\right]$$
$$(2) \quad V_0' = a\left[C_{10} + (k-1)xc_1 + C_{30} + (k-1)C_3' + C_4 - C_L\right]$$
$$(3) \quad V = V_0' - V_0 = a(k-1)x \cdot c_1$$
INVENTOR.
ELBERT NEIL SHAWHAN
BY
ATTORNEYS

United States Patent Office 3,073,160
Patented Jan. 15, 1963

3,073,160
CAPACITY TYPE LEVEL METER
Elbert Neil Shawhan, Newtown Square, Pa., assignor to Sun Oil Company, Philadelphia, Pa., a corporation of New Jersey
Filed Sept. 9, 1958, Ser. No. 759,884
8 Claims. (Cl. 73—304)

This invention relates to capacity type level meters in which variation of capacity as material rises and falls between condenser plates of a probe is measured to secure a measure of surface level.

Meters of this type are generally considerably affected by changes in dielectric constant of the material undergoing measurement, whether solid or liquid, the dielectric constant being subject to considerable changes with variations of temperature and composition. Compensation for such changes is accordingly desirable, since otherwise the indicated levels would have to be corrected in accordance with independent measurements of dielectric constants or of the factors on which they depend.

In my application, Serial No. 449,437, filed August 12, 1954, now Patent No. 2,943,258, dated June 28, 1960, there is described a system for measurement of capacity at a point remote from the electronic apparatus involved. There is described therein compensation for changes in dielectric constant of material in a vessel. However, the compensation is most effective at one level, and the error in compensation increases as the level deviates from that value. In another application, Serial No. 502,445, filed April 19, 1955, now Patent No. 2,963,908, dated December 13, 1960, there is described an improvement which permits level measurements with complete compensation for dielectric constant changes. However, as described in said application, the system involves for this compensation a special multi-section probe.

In accordance with the present invention there is provided metering apparatus of the capacity type in which compensation for change of dielectric constant is achieved in a fashion applicable to any type of level-sensing probe. The level being measured or the dielectric constant of the material may vary over wide limits without affecting the compensation. In accordance with the invention the compensation is effected without sacrifice of the advantages afforded by the systems described in my prior applications, in particular, that of substantially complete independence of the measurements from effects arising from changes of impedance in a long connecting line between the point of measurement and the point at which readings or records are made. Level metering apparatus of this type is particularly adapted to measurements of levels in tank farms or the like where a single recording apparatus is used for the making of level measurements in various tanks the connections to which may differ very greatly in length. In accordance with the present invention, the compensation for dielectric constant is involved solely at the tank or other vessel subject to measurement, so that here also there may be utilized a common recording apparatus for a number of tanks or vessels.

The attainment of the foregoing general objects as well as other objects of the invention particularly relating to details of construction and operation will become apparent from the following description, read in conjunction with the accompanying drawings, in which:

FIGURE 2 is a plot of an impedance versus a capacitance, explanatory of the invention;

FIGURE 3 is a plot of a voltage versus a capacitance, also explanatory of the invention; and FIGURE 4 is a set of expressions involved in the theory of operation in accordance with the invention.

Figure 1:
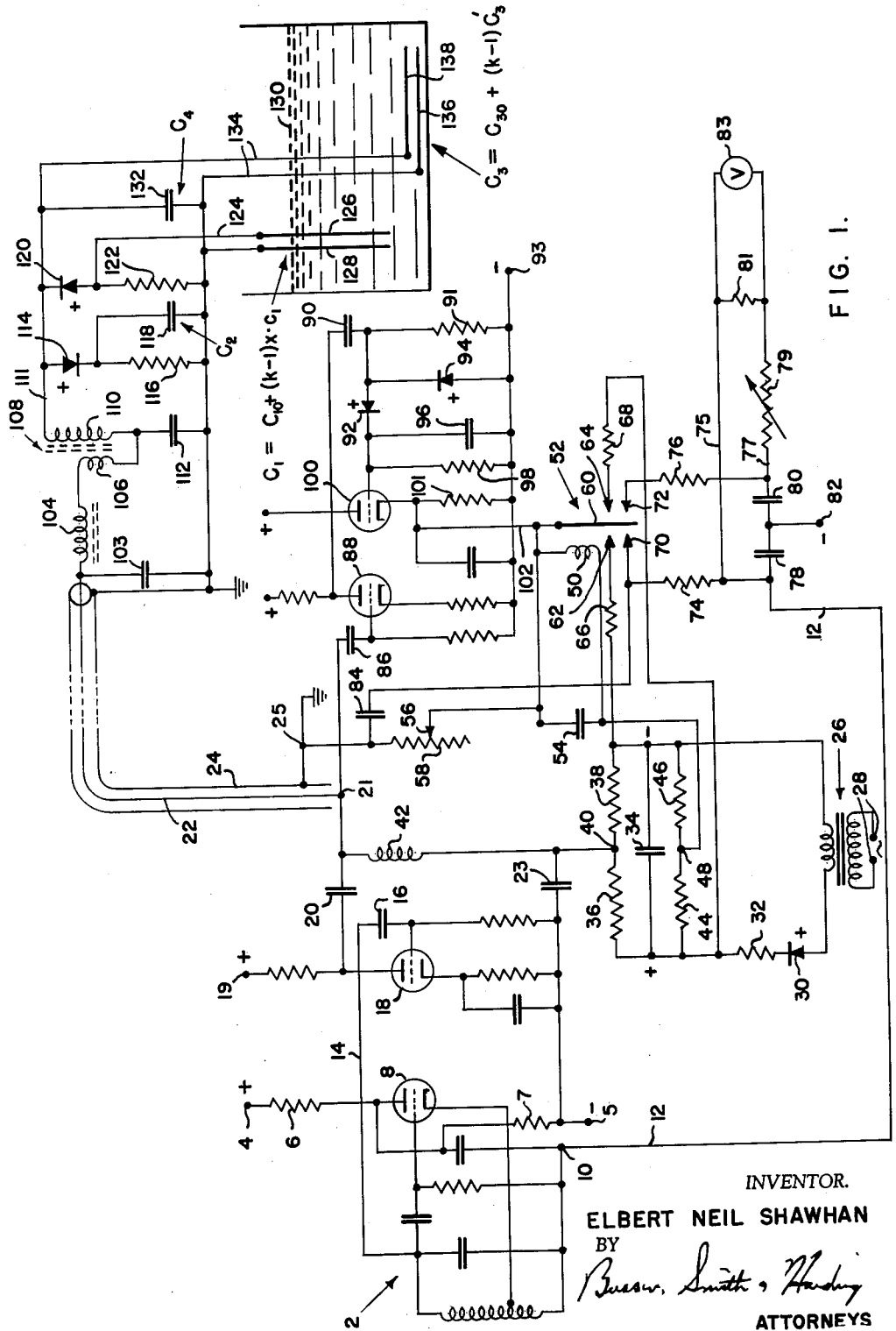
FIGURE 1 is a diagram showing the wiring arrangement of elements involved in carrying out the present invention together with an indication of the elements associated with a tank or vessel in which level is to be measured.

While the invention is illustrated in the drawings and will be primarily described in its application to the measurement of liquid levels, it will be apparent that the invention is applicable to the measurement of beds of solid materials such as catalysts or the like.

There will first be described with particular reference to FIGURE 1 the form and wiring of the electrical apparatus involved.

There is indicated at 2 an oscillator operating at a frequency which may typically be of the order of 15 kilocycles per second, though the frequency may vary through wide limits. A frequency of the order stated is desirable since it is sufficiently high to provide reactances of reasonable values with small capacitances, while at the same time, it is not so high as to involve difficulties with standing waves, radiation, etc. The oscillator comprises, in association with conventional circuitry, the triode 8 which is supplied with positive and negative direct potentials at terminals 4 and 5 respectively, there being provided resistors at 6 and 7 determining the anode potential with respect to the positive and negative supply terminal potentials. A terminal 10 supplied through a connection 12, hereafter described in greater detail, controls the cathode potential and thereby the amplitude of the output of the oscillator. In particular, the oscillator is of a type which will operate with a potential as low as two volts between its anode and cathode.

The oscillator 2 feeds its output through a connection 14 including the capacitor 16 to an amplifier including the triode 18 which is connected between the negative supply terminal 5 and a positive supply terminal 19. Capacitors 20 and 23 isolate the amplifier from a direct potential standpoint from the remaining portions of the apparatus to be described.

The high voltage direct power supply for the oscillator and amplifier just mentioned as well as for an amplifier later discussed is conventional in form and not shown. The voltage between the terminals 4 and 5 is regulated. It may be remarked at this point, that the power supply is "floating" in the sense that no terminal thereof is connected directly to the effective ground of the apparatus as is very commonly the case. More will be said about this point later.

The capacitor 20 is connected at 21 to the central conductor 22 of a coaxial cable 24 which extends from the apparatus at the recording point to the probe devices at the tank or other vessel in which level is to be measured. This coaxial cable may be of very considerable length. Furthermore, if a single recording apparatus is to be used in conjunction with various tanks or vessels for measurements individually in the latter, a switching system may be used to connect to the capacitor 20 any desired number of coaxial cables similar to 24. The sheath of the coaxial cable is shown as grounded at the terminal 25. This ground is the effective reference for both high frequency and for direct potentials in the system.

A transformer 26 has its primary energized from a commercial current supply 28 and provides a relatively low voltage output which is rectified by the diode 30 and filtered to the extent required by the arrangement of resistor 32 and capacitor 34. The arrangement provides a low voltage direct current supply which is also floating with respect to the ground 25. A divider is provided by the equal resistors 36 and 38 joined at the terminal 40 which is connected to the capacitor 23 and through choke 42 to the capacitor 20 and terminal 21. Another voltage divider is provided by the equal resistors 44 and 46 joined at a terminal 48.

To the terminal 48 there is connected one end of the winding 50 of a polarized relay 52, the winding 50 being shunted by the capacitor 54. The movable contact 60 of this relay is connected to the other end of winding 50 and to the movable contact 56 of a resistor 58 connected to the ground terminal 25. The resistance 58 is of low value and adjustment of its contact affords a zero adjustment for the system. From the standpoint of the operation described hereafter it will be convenient to consider the movable contact 60 of the relay as constituting the ground of the system, disregarding the resistance between the terminal 25 and this contact.

The movable contact 60 operates between one pair of fixed contacts 62 and 64 which are respectively connected through the resistors 66 and 68 to the negative and positive terminals of the power supply energized from the transformer 26. A second pair of contacts 70 and 72 engageable by the movable contact 60 are connected respectively through resistors 74 and 76 to terminals of capacitors 78 and 80, the other terminals of which are joined and connected to the negative supply terminal 82 of the high voltage power supply, this terminal 82 being the same as terminal 5 previously described. The junction between resistor 74 and capacitor 78 is connected to terminal 10 through connection 12. Contact point 70 is connected through capacitor 84 to the ground terminal 25. The unjoined terminals of the capacitors 78 and 80 are respectively connected through lines 75 and 77 to a meter 83 which may be of recording type to record changes in level measured. This meter is shunted by a resistor 81 and is in series with an adjustable resistor 79 which is provided for scale range adjustment.

A capacitor 86 connects the central conductor 22 of the coaxial cable with the grid of a triode 88 arranged in an amplifier circuit and providing its output through capacitor 90 to a peak voltmeter arrangement comprising resistor 91, diodes 92 and 94, a capacitor 96 and a resistor 98 to provide an input to a cathode follower which serves as a measure of the high frequency signals delivered from the amplifier 88. The cathode follower includes the triode 100 and has the return of its cathode resistor 101 to the negative power supply terminal 93 which is the same as the terminals 5 and 82 heretofore mentioned. The cathode of triode 100 is connected at 102 to the movable contact 60 of the relay 52.

At the end of the coaxial cable 24 remote from the apparatus already described there is the tank assembly. The central conductor 22 of this cable may, if required by the constants of the system, be connected to the grounded sheath through a capacitor 103. It is also connected through a toroidal coil 104 (which may typically have an inductance value of 2.5 millihenries) to the smaller winding 106 of a transformer 108 having the larger winding 110 connected as illustrated to the smaller winding providing an autotransformer. The connection of the two windings is joined to ground through the capacitor 112. The unconnected end of the winding 110 is connected to the line 111. Between this line and ground a diode 114 is connected in series with the parallel arrangement of a resistor 116 and a capacitor 118. Also connected between the line 111 and ground is a diode 120 in series with the parallel arrangement of a resistor 122 and the capacity provided by the connection 124 to one probe element 126 associated with a second probe element 128, both of these extending through the level 130 of the liquid or other material to be measured. The probe elements 126 and 128 are spaced to provide the plates of a condenser between which the level of the material rises to provide a varying capacitance as a measure of the liquid level. The probe elements 126 and 128 may be of any desired length to extend through the range of levels to be measured. It will be noted that the diodes 114 and 120 are oppositely polarized with respect to the line 111 and ground.

Also connected between the line 111 and ground is a fixed capacitor 132. Also connected between line 111 and ground are leads 134 extending to the plate forming elements 136 and 138 of a probe which is always immersed in the material in the vessel or tank, the material entering between these elements to provide a capacitor, the capacitance of which varies with the dielectric constant of the material undergoing measurement.

Before proceeding with the more material and fundamental aspects of operation, there may be described certain other aspects of operation which from the standpoint of theory may then be treated merely by reference to their general effects.

The relay 52 is vibrated at a frequency which may typically be about 5 cycles per second, though this frequency is of little significance. Vibration is maintained by the alternate contacts by the movable element 60 with the fixed contacts 62 and 64 which impose the flow of oppositely directed currents through the winding 50 from the power supply in view of the connections through resistors 66 and 68 and the connection to terminal 48. As already pointed out, the relay is of the polarized type so that the movable contact 60 is driven in opposite directions to engage the contacts 62 and 64, with reversal of driving current upon each engagement.

Considering the effectively grounded condition of the movable contact 60, it will also be noted that the successive contacts at 62 and 64 will, through the connection from terminal 40 through choke 42 to the central conductor 22 of the coaxial cable and then through the connections to the line 111 impose direct potentials of successively opposite signs to the diodes 114 and 120. When contact occurs between 60 and 62, a positive potential with respect to ground will appear at terminal 40 and will be applied by the conductive connections to the line 111 thereby rendering the diode 114 conductive and the diode 120 non-conductive. This situation is reversed when contact occurs between 60 and 64. The result, accordingly, is that during one-half cycle of the relay the capacitor 118 will be effectively in the circuit while the capacitor provided by the probe elements 126 and 128 will be out of the circuit. This condition is reversed during the next succeeding cycle. The capacities provided at 132 and by the plate elements 136 and 138 will always be in the circuit. In effect, this provides a switching action for the capacitances involved. As will be more fully apparent hereafter, this switching action is primarily responsible for the effective elimination of distributed capacitance in the coaxial cable as a factor in operation, since within the successive half cycles which reoccur in rapid sequence the cable capacitance is effectively constant and since the difference between the capacities presented to the cable connections is essentially measured, the effect of the cable capacity disappears.

There will now be described the aspects of operation which are concerned more directly with the elimination of effects of varying dielectric constant.

Consideration may be first given to the characteristics of the impedance presented at the terminal 21 of the coaxial line as a result of capacitance variations in the circuit at its farther end associated with the tank or vessel. Assuming the effective capacitance at any time between the line 111 and ground to be represented by C, the variation of impedance Z at the terminal 21 is as indicated in FIGURE 2. As therein shown, at a low value of C the impedance Z has a minimum value at M and then increases with increase of C to a maximum at M' due first to a series resonant condition and then a parallel resonant condition of the complete circuit including the capacitance at 112 and the capacitance of the line together with a physical capacitance, if any, at 103. Between values of C such as A and B, the variation of impedance Z is substantially linear and inductive. By the choice of fixed capacitances at 103, 112 and 132 in conjunction with proper inductances at 104, 106 and 110, the variations of Z may be maintained in this linear region through the ranges of changes of C involved in the changes of level in the tank and expected changes of the dielectric constant $k$.

Considering, now, the voltage $V_s$ between the movable relay contact 60 and the negative supply terminal 82, this, plotted against C, gives curves such as indicated in FIGURE 3 in which each curve corresponds to a different amplitude of the oscillator output and each has a linear region corresponding to that of Z. Since the corresponding ordinates of these curves maintain a proportionality through their linear regions, their linear portions may be represented by the expressions for $V_s$ applied to the curves, the curves having the individual constants $a_1$, $a_2$, and $a_3$, with intersection at some point on the C axis as $C_1$. (These three curves represent respectively the values of $V_s$ achieved during charging conditions of the capacitors 78 and 80 for three different oscillator amplitudes resulting from the action of the feedback which controls the amplitude of oscillations of the oscillator.)

The various capacitances which together make up C are indicated in FIGURE 1. The capacitance $C_1$ provided by the probe elements 126 and 128 is made up, as indicated, of a capacitance $C_{10}$ which would represent the capacitance of the probes and their leads with the tank empty, plus a variable capacitance which involves the dielectric constant $k$ minus 1 times the depth of immersion $x$ times the capacitance per unit length with air as dielectric, $c_1$. $x$ is, of course the measure of the level of the material.

The capacitance at 118 is $C_2$, chosen to be almost equal to but slightly smaller than $C_{10}$.

$C_3$ is the capacitance presented by the immersed plates or probe elements 136 and 138. It is made up of a capacitance $C_{30}$ which is the capacitance which would exist between the plate elements with the material absent plus the capacitance of the leads 134, plus the dielectric constant $k$ minus 1 times the capacitance of the plates 136 and 138 which would exist with the material absent, namely $C_3'$.

$C_4$ is the capacitance of the capacitor 132, chosen to ensure operation along the straight part of the impedance characteristic.

Turning, now, to the operation, the high frequency input at the terminal 21 will produce through the amplifier at 88, the peak voltmeter arrangement fed thereby, and the cathode follower 100, a voltage $V_s$ which at the times of application to the capacitor 78 will build up a charge thereon relative to the negative supply terminal 82. The potential $V_s$ thus built up is fed back through connection 12 to the terminal 10 of the oscillator, to control the oscillator cathode potential and thereby also the amplitude of the output of the oscillator. Referring to FIG. 3 and assuming that operation is along the $V_s$ curve corresponding to oscillator output amplitude $a_1$, if the dielectric constant of the material increases, the capacitance C will increase. This increase of C results in an increase of $V_s$ which, applied to capacitor 78, is fed back through connection 12 to the oscillator to control its output amplitude to bring it to a lower output amplitude $a_2$, for example. This change or control of the oscillator output amplitude causes the operation to now be along the $V_s$ curve corresponding to the lower oscillator output amplitude $a_2$. The oscillator output amplitude is so controlled, by means of this feedback arrangement, to maintain the voltage $V_0$ across capacitor 78 substantially constant, as indicated by the dotted line in FIG. 3, which intersects the various curves representing the different oscillator output amplitudes. Of course, if the dielectric constant of the material decreases, the capacitance C will decrease, resulting in a voltage across capacitor 78 which fed back to the oscillator, will control its output amplitude in a direction opposite to that previously described. Again, the voltage $V_0$ across capacitor 78 will be maintained substantially constant. It may be seen that the dielectric constant changes referred to are reflected in the capacitance $C_3$, which forms a part of the capacitance C at the time that capacitor 78 is switched into the circuit by relay 52. The above-described oscillator output amplitude control action, will, of course, alternate with charging of the capacitor 80 which will be referred to later. Considering only the charging of the capacitor 78, the final fixed potential $V_0$ across capacitor 78 will be given by the Expression 1 in FIGURE 4, in which C, heretofore used, is now replaced by the actual sum of capacitances presented during the half cycles during which the diode 114 is conductive and diode 120 is cut off.

During the other half cycles, the potential across the capacitor 80 will reach a value $V_0'$ given by Expression 2 in FIGURE 4.

$C_2$ is chosen slightly smaller than $C_{10}$. $V_0'-V_0$ can then be reduced to zero, when the vessel is empty by turning the zero control potentiometer 58. $C_3'$ is a design parameter for the range of dielectric constants to be covered. The fixed condenser $C_4$ can be chosen so that $$C_2+C_{30}+C_4=C_1$$

Then, since $V_0$, $C_2$, $C_{30}$, $C_3'$, $C_4$ and $C_1$ are all constants, independent of $k$, from (1) of FIGURE 4, $$a(k-1)=\frac{V_0}{C_3}$$

a constant. $a$ is the slope of the linear portion of each curve and is proportional to the reciprocal of $(k-1)$, being constant so long as the amplitude of oscillations is constant.

During the other half cycles, the potential across the capacitor 80 will reach the value $V_0'$ given by Expression 2 in FIGURE 4, as previously stated. The amplitude of oscillations being the same, $a$ in this expression is the same as in Expression 1.

Recall that $C_2$ was made approximately equal to $C_{10}$. The voltage V measured by the voltmeter 83 is the difference of Expressions 1 and 2 and is given in Expression 3. Since $c_1$ is a constant and a $(k-1)$ is also constant, as already established, the measured voltage is directly proportional to $x$. Thus, the measured voltage is linearly proportional to the level of material being measured and independent of its dielectric constant.

What is claimed is:

1. Apparatus for measurement of level of a surface of material comprising a terminal, a circuit connected to said terminal to provide an impedance thereat, means for switching alternately into said circuit a first capacitance provided by a pair of conductors extending through said surface level with the material between them to provide a dielectric therebetween in an amount varying with changes of said level and a second capacitance substantially equal to the value of the first capacitance when said level is a minimum, means providing a third capacitance permanently connected into said circuit so as to be in parallel respectively with said first and said second capacitances when the latter capacitances are alternately switched into said circuit, said third capacitance being provided by a pair of plate elements having a fixed amount of said material between them to provide a dielectric, said fixed amount being constant irrespective of the level of said material; means for supplying oscillations to said terminal, means for developing a first voltage proportional to the sum of said second and third capacitances, means for controlling the amplitude of said oscillations to keep said first voltage substantially constant, means for developing a second voltage proportional to the sum of said first and third capacitances, and means for measuring the difference between said first and second voltages.

2. Apparatus according to claim 1, in which said switching means comprises a pair of diodes oppositely poled in said circuit and means for applying thereto polarizing potentials to render them alternately conductive.

3. Apparatus according to claim 1, in which the first and second voltages are developed across separate capacitors during the respective switchings into the circuit of the second and first capacitances.

4. Apparatus according to claim 1, wherein said switching means comprises a pair of diodes oppositely poled in said circuit and means for applying thereto polarizing potentials to render them alternately conductive, and wherein the first and second voltages are developed across separate capacitors during the respective switchings into the circuit of the second and first capacitances.

5. Apparatus according to claim 1, wherein the amplitude controlling means comprises feedback means connected between the first-mentioned developing means and said oscillation supplying means.

6. Apparatus according to claim 1, wherein said switching means comprises a pair of diodes oppositely poled in said circuit and means for applying thereto polarizing potentials to render them alternately conductive, and wherein the amplitude controlling means comprises feedback means connected between the first-mentioned developing means and said oscillation supplying means.

7. Apparatus according to claim 1, wherein the first and second voltages are developed across separate capacitors during the respective switchings into the circuit of the second and first capacitances, and wherein the amplitude controlling means comprises feedback means connected between one of said capacitors and said oscillation supplying means.

8. Apparatus according to claim 1, wherein said switching means comprises a pair of diodes oppositely poled in said circuit and means for applying thereto polarizing potentials to render them alternately conductive, wherein the first and second voltages are developed across separate capacitors during the respective switchings into the circuit of the second and first capacitances, and wherein the amplitude controlling means comprises feedback means connected between one of said capacitors and said oscillation supplying means.

References Cited in the file of this patent

UNITED STATES PATENTS

| | | |
|---|---|---|
| 2,093,416 | Case | Sept. 21, 1937 |
| 2,867,120 | Schafer | Jan. 6, 1959 |

FOREIGN PATENTS

| | | |
|---|---|---|
| 769,806 | Great Britain | Mar. 13, 1957 |